C. R. Waseige
INVENTOR

By: Marko & Clark
Attys.

Feb. 14, 1933.  C. R. WASEIGE  1,897,684
MEANS FOR DRIVING ROTARY COMPRESSORS FOR THE
SUPPLY OF INTERNAL COMBUSTION ENGINES
Filed March 21, 1928   6 Sheets-Sheet 4

C. R. Waseige
INVENTOR

Patented Feb. 14, 1933

1,897,684

UNITED STATES PATENT OFFICE

CHARLES RAYMOND WASEIGE, OF RUEIL, FRANCE, ASSIGNOR, BY MESNE ASSIGNMENTS, TO ECLIPSE AVIATION CORPORATION, OF EAST ORANGE, NEW JERSEY, A CORPORATION OF NEW JERSEY

MEANS FOR DRIVING ROTARY COMPRESSORS FOR THE SUPPLY OF INTERNAL COMBUSTION ENGINES

Application filed March 21, 1928, Serial No. 263,519, and in France April 2, 1927.

The present invention relates to means for driving rotary compressors for the supply of aircraft engines.

The invention has for its object to provide a device adapted to afford the driving of the compressor at different speeds according to the speed of the aircraft engine and more particularly a device adapted to afford the driving of the compressor at an increased speed when desired, for instance when the aircraft has reached the altitude corresponding to the normal running of the engine; the invention has also for its object to provide a device including clutching means having a very progressive action and a speed increasing device of reduced bulk and weight; the invention also contemplates the provision of means for constantly rotating the compressor even when the aircraft engine is running at slow speed (that is near the ground) and for automatically changing the gear ratio upon actuation of the clutch device. The invention has further for its object an improved construction and arrangement of the combined clutch and speed increasing device affording the proper centering of the various parts, by floatingly mounting the driving shaft and the sun wheels, when the speed increasing device is of the epicyclic type.

In the appended drawings which show by way of example a certain number of embodiments of the invention:

Fig. 12 is a diagrammatic view of the device according to the invention.

In Fig. 12, A denotes an aircraft engine and C a compressor for the supply of combustible mixture to engine A. Compressor C is driven by engine A through the medium of a clutching and speed increasing device B which will be hereinafter described. D denotes the carbureter connected with the intake conduit of compressor C.

Figure 1:
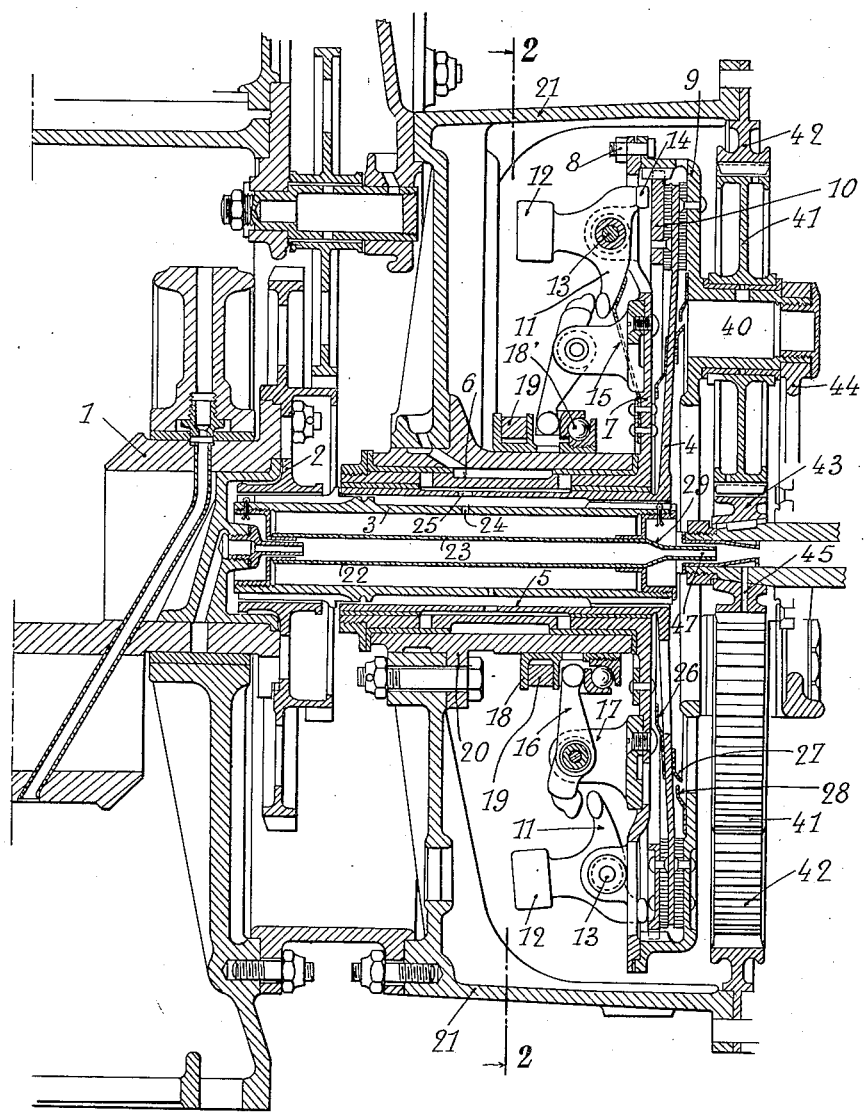
Fig. 1 is a longitudinal axial section of a first embodiment of the invention, the upper half of the figure showing the device in the unclutched position while the lower half shows the same in the clutched position.

Referring to Fig. 1, the crankshaft 1 of the engine has secured thereto a member 2 having internal flutings or grooves which engage corresponding grooves formed on an intermediate shaft 3. The said shaft is long enough to release the driving disc 4 of the clutch from the jarring of the crankshaft. For this purpose, shaft 3 extends through a hollow shank 5 rigid with said disc, grooves being formed at the end of said shank opposite the crankshaft. Shank 5 is journalled within the hollow shank 6 of a weight-carrying disc 7 secured to a circular case 9 forming the driven member of the clutch. A disc 10 is driven in rotation by the case 9, due to the provision of a toothed connection affording lengthwise motion of disc 10. Case 9 and disc 10 are provided with friction facings engaging the disc 4. When the disc 10 is urged towards the case 9 by a sufficient pressure, the actuating disc 4 drives the case 9. The pressure for the clutching is obtained by means of the rocking levers 11 provided with the weights 12 secured to the disc 7 and pivotally mounted on the axles 13 secured to the said disc. The rocking levers make contact by means of an arm 14 with the movable disc 10; the spring strips 15 constantly urge them into the contact position, with a slight pressure. The rocking levers 11 are employed in the proper number to distribute the pressure uniformly upon the periphery of said discs. The levers 16—pivoted to the forked brackets 17 secured to the weight-carrying disc 7—will permit by the use of a sleeve 18 longitudinally slidable under the control of a fork 19, to act upon the said levers 11 and to remove the said weights from the discs. A thrust ball-bearing 18' imparts the efforts of the sleeve 18 to the levers 16.

The operation of the said clutch device is as follows:

The engine is supposed to be running, and the sleeve 18 is in the released position as shown in the drawings in the part of the section situated above the centre line. The springs 15 are compressed, and the weights 12 are separated from the disc 10. A certain play now exists between the actuating disc 4 and the actuated disc 10, and the disc 4 turns loosely without actuating the case 9. When the fork 19 is operated (as will be further described) to bring said sleeve into the clutched position as shown in the drawings, the springs 15 are released and act upon the levers 11, thus pressing them slightly upon the disc 10. The actuating disc 4 then commences to rotate the said case together with the rocking levers. Due to the centrifugal action upon the weights 12, the rocking levers continually press to a greater degree upon the said disc, until the disc 4 is completely engaged with the case 9. The clutching action is now entirely effected.

To release the clutch, the sleeve 18 is brought to its initial position by the fork 19; the rocking levers cease to act upon the discs, and the disc 4 again turns loosely without effect upon the case 9.

It should be observed that firstly, the clutching action is very uniform and progressive irrespectively of the operating speed, since the pressure on the discs which is very small at the beginning of the action, will not abruptly attain its maximum value as occurs in the usual spring devices, but will progressively increase according to the speed of the actuated part; secondly, the efforts of the said rocking levers are balanced, and give rise to no resultant action upon the bearings; thirdly, during the clutching action, the said weights are independent and will act separately, no effort being exercised upon the releasing sleeve; fourthly, during the uncoupling action, the effort to be exercised to overcome the centrifugal force is momentary, and it ceases when the clutch is disengaged, the said rocking levers being placed on the actuated part and not on the actuating part, so that during the unclutching period which by reason of the special arrangement of the apparatus may be of long duration, the operating parts such as levers, rods and the like are not subjected to stresses; fifthly, the effort of the said weights providing for the clutch engagement is proportional to the square of the speed and follows substantially the same law of increase relatively to the speed as the load couple of the compressor, so that the degree of absorption, by the clutch, of the jarring and of the irregularities of the couple imparted by the crankshaft will remain practically the same, irrespectively of the driving speed. Particularly, at slow speeds of the engine at which the power torque and the rotation of the crankshaft are as a rule somewhat irregular, the said clutch will be enabled to slip under the action of such irregularities, without imparting them to the speed-increasing gears, as is the case when the clutching pressure is constant and maintains its maximum value at all speeds.

The whole movable part rotates in a bearing 20 which is properly centered and is bolted to the closed case 21. By this construction the foundry work is simplified, and the movable combination can be separately erected.

The apparatus is lubricated by a supply of oil to the central part. The oil is distributed to the bearings—as shown in the drawings—by a tube 22 and the orifices 23, 24, 25. The splashing oil is collected by the deflecting devices 26, 27, 28 which protect the discs and also oblige the oil to enter the bored arms disposed on the case 9.

Figure 2:
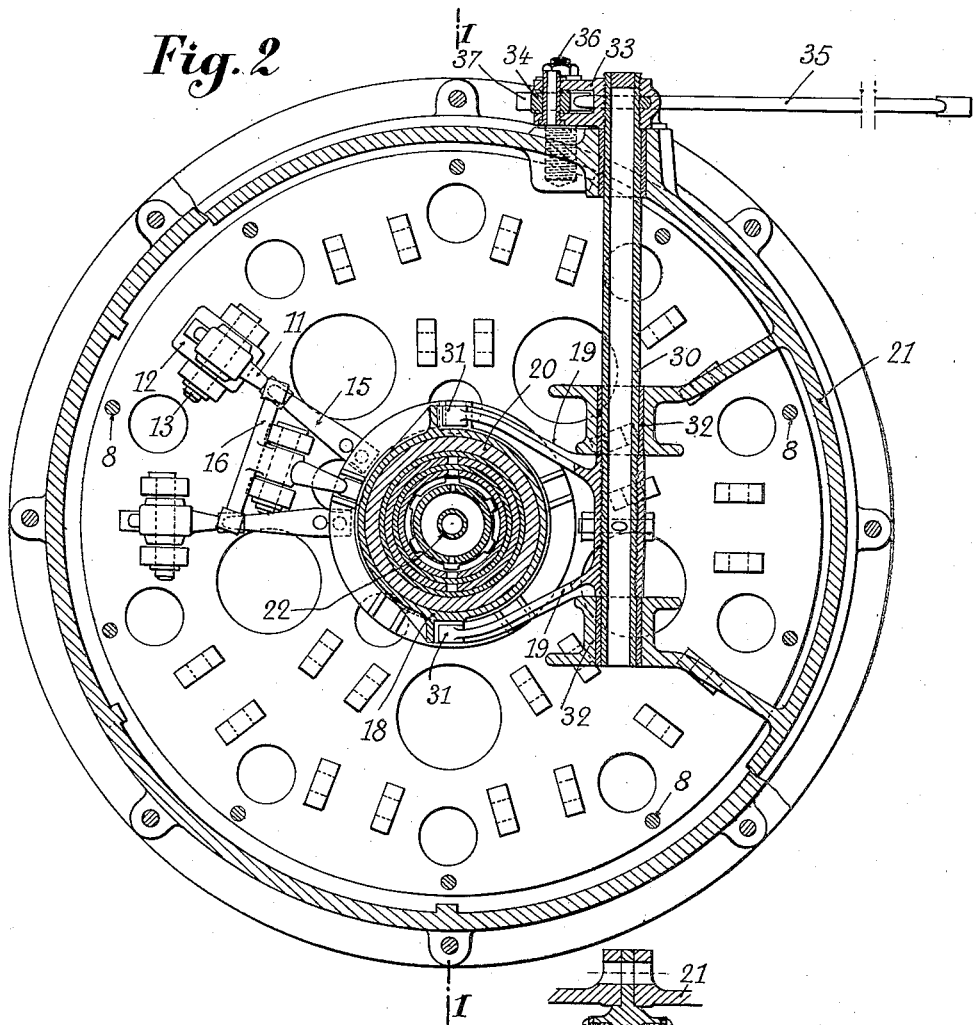
Fig. 2 is a cross section on the line 2—2 of Fig. 1.
Figure 4:
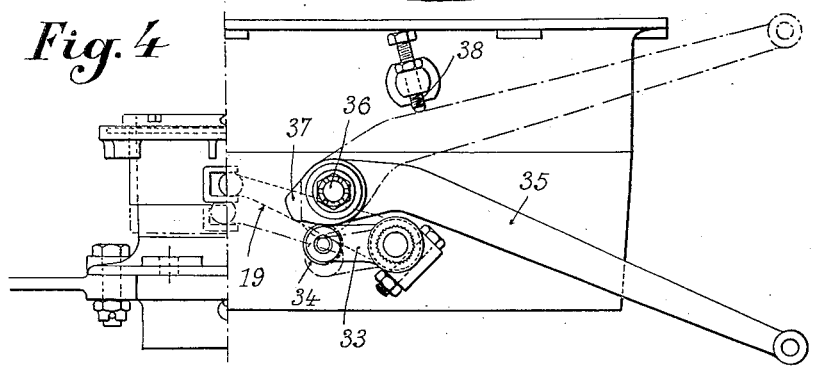
Fig. 4 is a plan view of the clutch controlling device.

The sleeve 18 is controlled in the following manner:

The fork 19 mounted on the shaft 30, Fig. 2, is provided with two studs 31 engaging two respective recesses on the periphery of the sleeve 18 and thus holding said sleeve against rotation while it is slidable on the bearing 20. The shaft 30 rotates in the bearings 32 which is mounted on the case 21 and are provided with a lever 33 carrying at the end a roller 34. A lever 35 is pivotally mounted at 36 (Figs. 2 and 4) and carries a cam 37 coacting with the roller 34. The cam 37 is so constructed that the rotation imparted to the lever 33 will be smaller at the start of the clutch release, at which time the effort to be overcome is relatively great. The motion of the lever is limited by the stop 38.

The speed-increasing device is constructed as follows:

The actuated case 9 of the clutch device is provided with three journals 40 (Figs. 1 and 3) which are formed in one therewith and are spaced apart by 120 degrees; upon the said journals are rotatable—through the medium of smooth rings or ball bearings—the planetary gears 41 which cooperate with an internal tooth ring 42 secured to the casing of the compressor, and also, at the central part, with a pinion 43 secured to the compressor shaft and thus disposed on the same centre line as the clutch and the crankshaft. A cross-bracing member 44 prevents all flexion of the said journals. When the casing 9 rotates, it actuates the planetary gears 41 which roll in the ring 42 and drive the central pinion 43 at a greater speed than that of the casing 9, with a suitably chosen gear ratio. The driving stresses will only produce couples, and are distributed upon a great number of teeth, which is a most favourable condition for the good performance of the gearing. The speed is also increased in conditions of minimum size, both longitudinal and diametrical.

Figure 5:
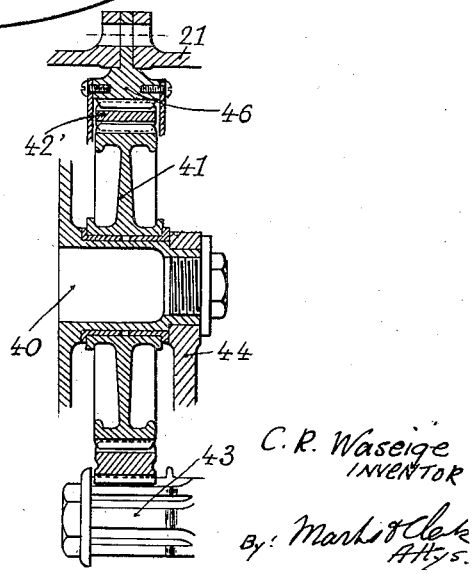
Fig. 5 is a partial section of a modification of the epicyclic speed increasing gear.

To assure the accurate and simultaneous engagement of the three planetary pinions with the outer stationary ring, this latter may be disposed as shown in Fig. 5. The planetary pinions 41 roll inside a ring 42' provided on the exterior with grooves or flutings which cooperate with like flutings formed in a maintaining piece 46, bolted to the casing 21 of the clutch device. A certain diametrical play is allowed between the ring 42' and the piece 46, so as to compensate for the slight differences in the concentric or the parallel position of the piece 46 and of the casing which supports the planetary pinions; these latter will oblige the said ring to straighten and to become centered in an automatic manner.

In like manner, and for the same purpose, the central pinion 43 may be mounted with a slight diametrical and longitudinal play by means of flutings upon the shaft of the compressor.

The said planetary pinions are lubricated by means of the deflecting devices 26, 27, 28 which conduct the oil issuing from the bearings, through the duct 29 into the interior of the journals 40 which are bored for the purpose. The gear teeth are lubricated by the splashing of the oil, and also by oil supplied at 47, this oil being circulated through a hole 45 and a duct formed in the shaft and in the pinion 43, and supplied directly to the pinion teeth, thence circulating upon the other teeth to oil and cool them. The planetary pinions 41 are provided with grooves for collecting the issuing oil, and with peripheral holes by which this oil may be supplied to the teeth.

Figure 3:
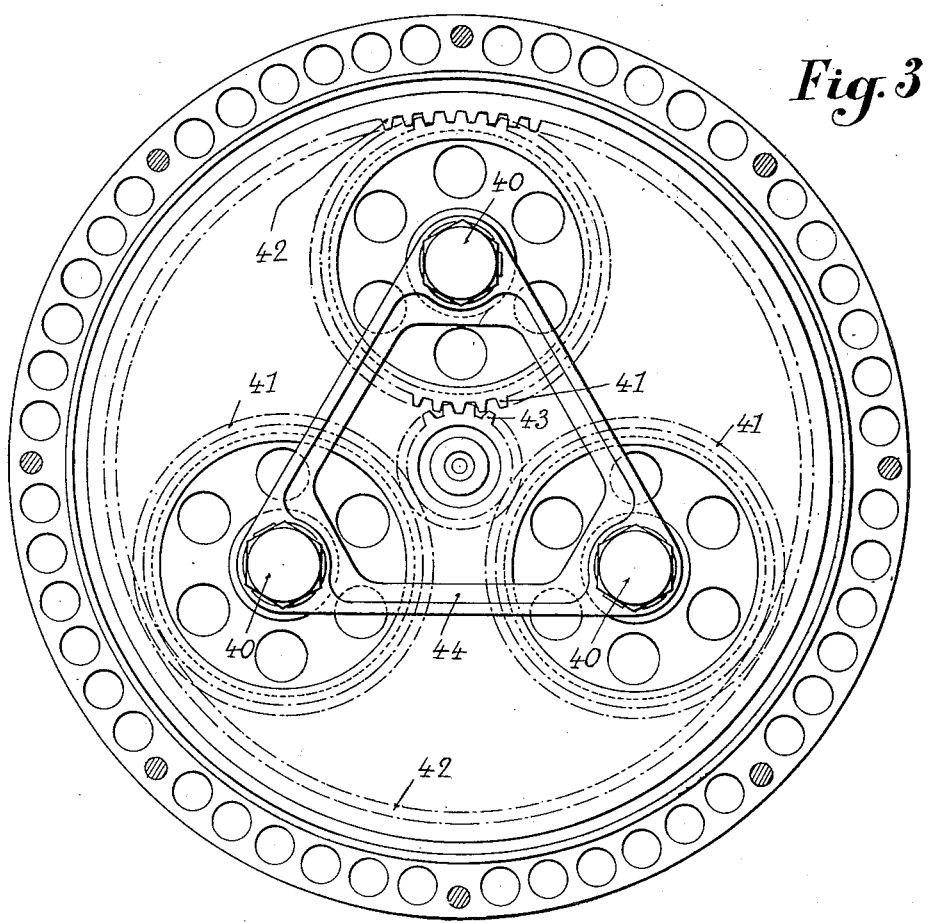
Fig. 3 is an end view showing the planetary pinions in elevation.
Figure 6:
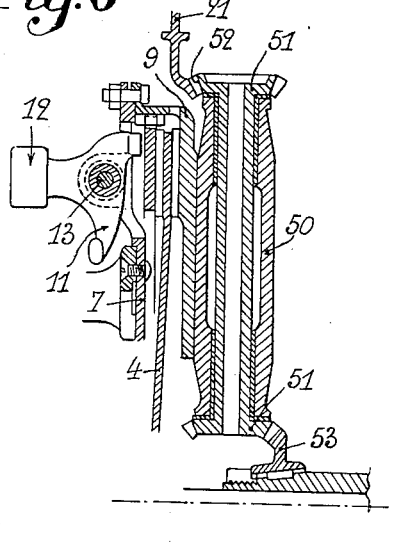
Fig. 6 is a partial section of a modification.

A modification of the device shown in Figs. 1, 3 and 5, is shown in Fig. 6. In this embodiment of the invention, the planetary pinion-carrying member 9 is formed with radial bearings 50 in which are pivoted the planetary pinions 51, which herein are formed by an elongated shank having bevelled gears at both ends, one of said gears meshing with a stationary bevel gear 52, rigid with the crankcase 21 and the other meshing with a bevel pinion 53 secured to the compressor shaft. It will be seen that the rotation of member 9 causes the planetary pinion 51 to roll upon the stationary pinion 51 and to rotate pinion 53 at a speed greater than that of member 9.

Figure 7:
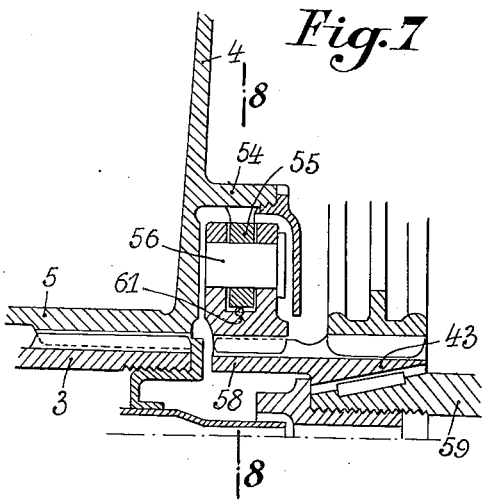
Fig. 7 is a partial section of the means for driving the compressor at reduced speeds of the aircraft engine.

In the devices above described, the compressor is driven by the motor only when the clutch device is in the clutching position, that is during the periods of normal running of the aircraft engine, with the aircraft at a determined altitude, periods during which the pilot wishes to actuate the compressor at a high speed. In the case where the carbureter D (Fig. 12) is connected with the intake conduit of the compressor C, that is when the combustible mixture passes through the compressor C before being admitted to the engine, it is desirable to rotate the compressor at a comparatively low speed in order to secure an intimate mixture and stirring of the combustible mixture and to reduce the depression in the engine intake manifold. For this purpose, the device shown in Fig. 7, which is quite similar to the device of Fig. 1 as far as the clutch and the speed increasing gear are concerned, is however adapted to afford the direct drive of the compressor by the engine when the clutch device is in the unclutching position. For this purpose, the driving disc 4 of the clutch is formed on its outer face with a cylindrical flange 54 having inner teeth 54ª whose faces have the outline shown in Fig. 8. The flange 54, which is coaxial with the crankshaft bearing, forms an inner ratchet wheel with which cooperate suitable pawls 55 pivoted at 56 on a sleeve 57, mounted on the end 58 of pinion 43 through the medium of suitable flutings, pinion 43 being keyed to the compressor shaft 59, as above described. Said pawls 55 are formed at the end opposite the part which cooperates with the teeth 54ª with weighted parts 60ª, and are associated with springs 61 which tend to maintain said pawls in engagement with the ratchet wheel.

When the aircraft engine is running with the clutch device in the unclutched position, the disc 4 rotates the sleeve 57 through the medium of pawls 55, said sleeve 57 driving the pinion 43 and hence the compressor shaft 59. This position of the pawls 55 is indicated in the upper half of Fig. 8.

Figure 8:
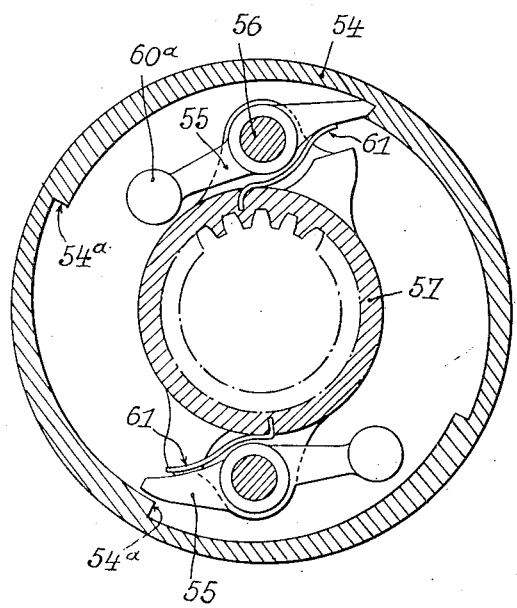
Fig. 8 is a section on the line 8—8 of Fig. 7.

When the clutch device is brought to its clutching position, the disc 4 tends to directly rotate the member 9 and the rotor of the compressor assumes a progressively increasing speed passing from the slow speed, which is imparted thereto directly by the engine, to the high speed, which is transmitted through the medium of the speed increasing gear; the pawls 55 progressively recede from the ratchet teeth 54ª and are finally disengaged due to the centrifugal force acting upon the weighted parts 60 (position shown in the lower half of Fig. 8). From this instant, the compressor shaft is driven through the medium of the speed increasing gear. When the clutch is again released, the pressure-increasing members 14 are kept apart from the disc 10 and the driving disc 4 rotates without driving the member 9, whereby the speed of pinion 43 progressively decreases. Hence the pawls 55 come back into engagement with the ratchet teeth under the action of the springs 61 and begin to operate as soon as the speed of the compressor tends to become lower than that of the engine. At this instant, the compressor is directly actuated by the engine and rotates at the speed of the latter without any shock.

It will be seen that the device above described affords either the direct drive of the compressor by the engine, or the drive of the compressor at a speed above the engine speed when desired by the operator.

Figure 9:
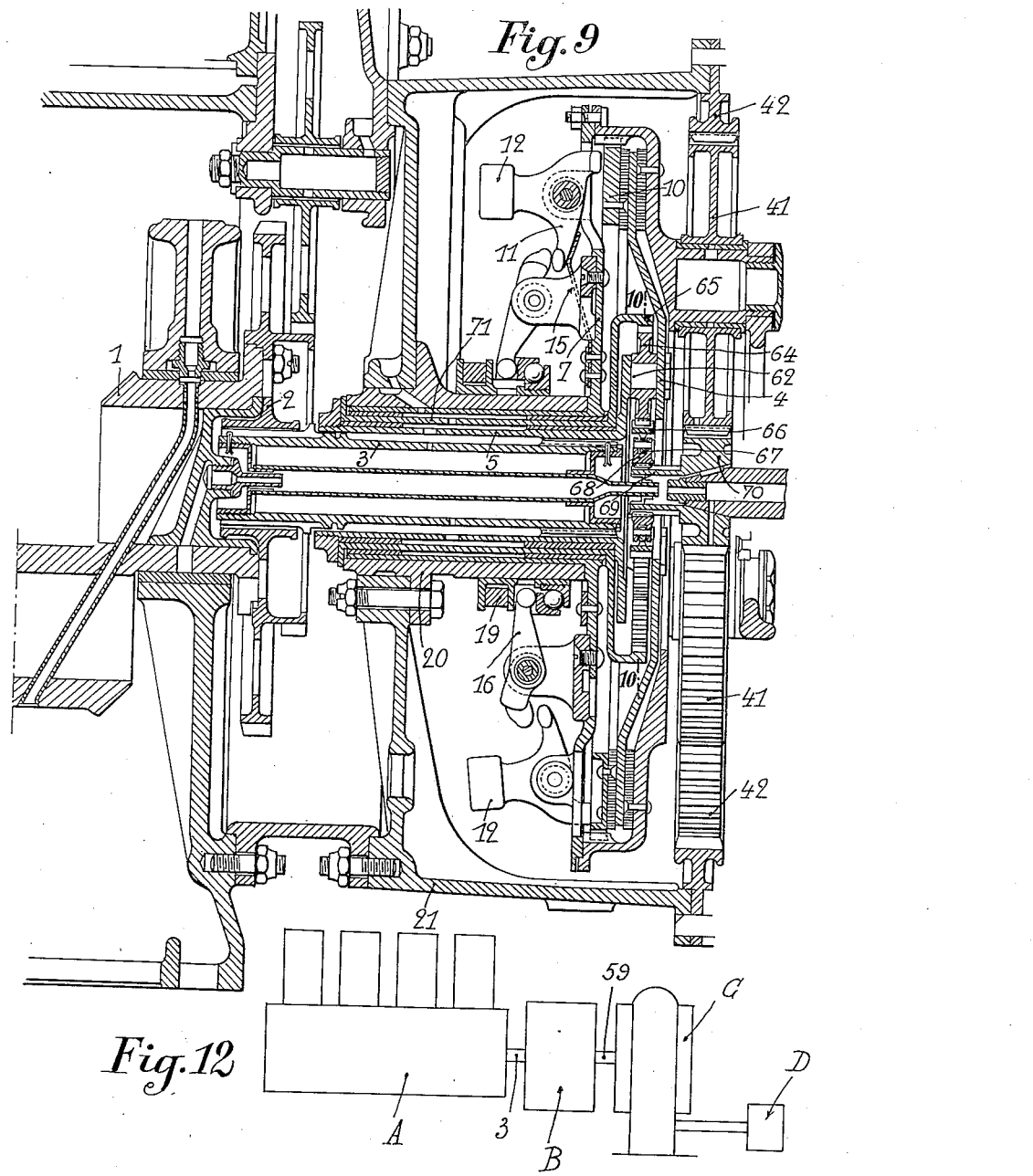
Fig. 9 is an axial section similar to Fig. 1 and showing a modification of the device including a second speed increasing gear for driving the compressor at slow speeds of the engine shaft.
Figure 10:
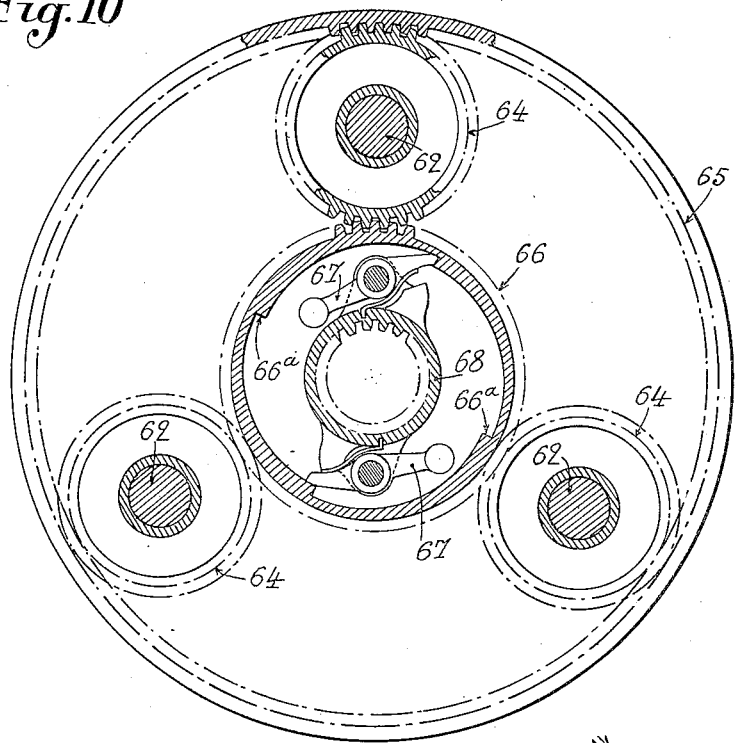
Fig. 10 is a section on the line 10—10 of Fig. 9.

Instead of directly actuating the compressor by the engine, when the clutch is in unclutching position, provision may be made of a second speed increasing gear interposed between the engine and the compressor, thus affording the drive of the compressor in all cases at a higher speed than that of the engine. Such a device is shown in Figs. 9 and 10, the clutch and the speed increasing gear which afford the higher speeds of the compressor being similar to those above described, said device comprising however a second speed increasing gear for slow speed. Said latter gear comprises spindles 62, carried by the driving disc 4 of the clutch and by a disc 63 formed at the outer end of the crankshaft journal, or, as shown, at the outer end of the sleeve 5, driven by the intermediary shaft 3. On said spindles 62, are mounted loose the planetary pinions 64 meshing on the one hand with an internally toothed disc 65 and on the other hand with a toothed ring 66, having inner ratchet teeth 67 similar to the ratchet teeth 54ª of Fig. 8. The inner ratchet wheel formed by ring 66 cooperates with pawls 67 pivoted to a socket 68, secured to the end 69 of pinion 70, the latter being keyed to the compressor shaft and cooperating with the planetary pinions of the main speed increasing gear. Disc 65 is carried by a tubular shaft 71 coaxial with the shaft 3 and sleeve 5 and held against rotation in the central bearing 20 by means of flutings or any other suitable means.

When the clutch is in the unclutching position, the compressor shaft is actuated at a relatively slow speed (higher however than the speed of the driving shaft 3) in the manner described with reference to the sleeve 57 of Fig. 8. When the clutch is brought to the clutching position, the pawls 67 operate in the manner described with reference to the pawls 55 of Fig. 8, the compressor shaft being driven at high speed through the medium of the speed increasing gear for the high speeds. Upon unclutching, the operation of pawls 67 is the same as for pawls 55.

Figure 11:
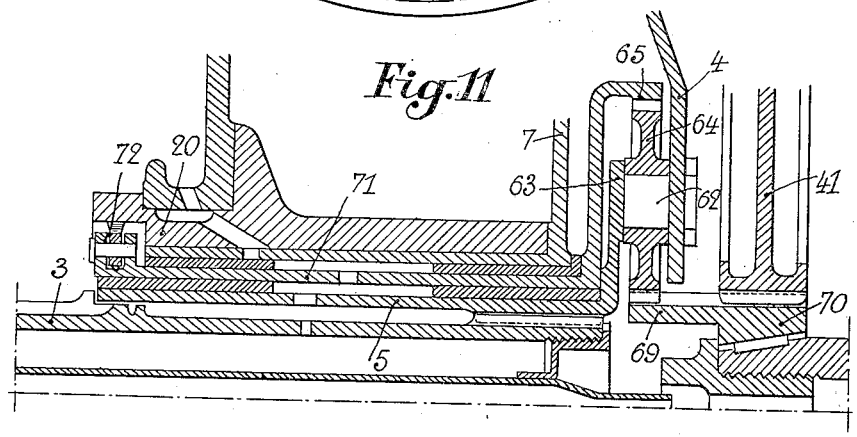
Fig. 11 is a partial section of a modification of the device shown in Fig. 9.

Fig. 11 shows a modification of the device shown in Figs. 9 and 10, wherein the planetary pinions 64 are in direct engagement with a gear toothing formed on the end 69 of pinion 70. In this embodiment, the hollow shaft 71 which carries the disc 63 is connected to the bearing 20 by means of a ratchet wheel with contrifugally operated pawls of the type above described.

Obviously, the said apparatus is susceptible of various modifications without departing from the scope of the invention.

Having now described my invention, what I claim as new and desire to secure by Letters Patent is:

1. In a supercharger for an internal combustion engine, a housing, a driving shaft, a driving clutch member, means for rotatively connecting said driving clutch member with the driving shaft and permitting longitudinal movement thereof, a compressor shaft, a driven clutch member in fixed axial relation to the housing, means for rotatively connecting said driven clutch member with the compressor shaft, pressing means rotatable with said compressor shaft and freely responsive to centrifugal force for pressing one clutch member against the other, said pressing means being adapted to automatically increase the friction pressure as the speed of said compressor shaft increases and control means engaging the pressing means adapted to be moved by the operator for either holding said pressing means in an inoperative position or releasing the same independently of the driving clutch member.

2. A combination according to claim 1, in which resilient means are provided for urging the pressing means to an operative position.

3. In a supercharger for an internal combustion engine, a housing, a driving shaft, a driving clutch member, means for rotatively connecting said driving clutch member with the driving shaft, a compressor shaft, a driven clutch member having a fixed axial relation with the housing, a rotary member rotatively connected with the compressor shaft and the driven clutch member, pressing means pivoted on said rotary member and freely responsive to centrifugal force for pressing one clutch member against the other, said pressing means being adapted to automatically increase the friction pressure as the speed of said compressor shaft increases and control means engaging the pressing means adapted to be moved by the operator for either holding said pressing means in an inoperative position or releasing the same independently of the driving clutch member.

4. In a supercharger for an internal combustion engine, a housing, a driving shaft, a driving clutch member having a hollow shaft, means for rotatively connecting said hollow shaft to the driving shaft, a compressor shaft, a driven clutch member, a rotary member having a hollow shank around said hollow shaft, a bearing sleeve around said hollow shank, means for rotatively connecting the said rotary member to the compressor shaft and the driven clutch member, spring controlled members pivoted on said rotary member and responsive to centrifugal force for pressing one clutch member against the other, said pressing means being adapted to automatically increase the friction pressure as the speed of said compressor shaft increases, oscillating levers pivoted on said rotary member and in engagement with the said spring controlled members, a control sleeve guided on said bearing sleeve and in operative engagement with the said oscillating levers and means for moving said control sleeve axially.

5. A combination according to claim 4, in which the means for rotatively connecting said hollow shaft to the driving shaft comprise a floating shaft arranged inside the hollow shaft and having fluted connections at its opposite ends with the hollow shaft and the driving shaft.

6. A combination according to claim 4, in which the means for moving the control sleeve axially comprise a rotary cam member, an actuating lever for said cam member, a pivoted lever adapted to be operated by said cam, an oscillating fork in engagement with said control sleeve and means for connecting said pivoted lever to said fork.

7. A combination according to claim 1, comprising also a primary speed increasing gear of the epicyclic type for operatively connecting the driven clutch member with the compressor shaft and means for operatively connecting the driving shaft with the compressor shaft, said means embodying a ratchet wheel adapted to be rotated by the driving shaft, weighted pawls responsive to centrifugal force and adapted to engage said ratchet wheel and a carrying member for said pawls rotatively connected with the compressor shaft.

8. In a supercharger device for internal combustion engines, a driving shaft, a driven supercharger element, a friction clutch element on the driving shaft, a cooperating driven clutch element operatively connected through step-up gearing with the supercharger element, and a manually controlled means on the driven clutch element for engaging the clutch element with a predetermined frictional engagement which increases directly with increases of speed of the supercharger element.

9. In a supercharger device for internal combustion engines, a shaft, a rotatable supercharger element, a frictional clutch element fixed to the shaft, a cooperating frictional clutch element drivably connected to the supercharger element having a pair of frictional faces spaced apart and adapted to receive the frictional clutch element on the shaft, and means for moving the frictional clutch faces into driving engagement with the clutch element on the shaft and increasing the frictional engagement therebetween as the speed of the supercharger element increases, and manual means engaging the last said means adapted to force the same to an inoperative position.

10. In a mechanism for use in supercharging internal combustion engines, a shaft, a rotatable supercharger element, a frictional clutch element fixed to the shaft, a cooperating frictional clutch element drivably connected to the supercharger element and having an overhanging portion, a depending frictional clutch element supported by the overhanging portion and forming with said portion a recess for receiving and cooperating with the clutch element on the shaft, and means for moving the depending clutch element into driving engagement with the clutch element on the shaft and increasing the frictional engagement between each of the clutch elements as the speed of the supercharger element increases.

11. In a mechanism for use in supercharging internal combustion engines, a shaft, a rotatable supercharger element, a frictional clutch element fixed to the shaft, a cooperating frictional clutch element drivably connected to the supercharger element having an overhanging portion, a depending frictional clutch element supported by the overhanging portion and forming with said portion a recess for receiving and cooperating with the clutch element on the shaft, means for moving the depending clutch element into driving engagement with the clutch element on the shaft, and increasing the frictional engagement therebetween as the speed of the supercharger element increases, and manually operated means for rendering the first said means ineffective.

12. In apparatus for use in supercharging internal combustion engines, a supercharger rotor, a driving shaft, means for establishing a rigid driving connection between said rotor and shaft, centrifugally actuated means for establishing a yielding driving connection between said shaft and rotor to drive the latter at an increased speed, and manual means for controlling the yielding driving connection.

13. In apparatus for use in supercharging internal combustion engines, a supercharger rotor, a driving shaft, means for establishing a rigid driving connection between said rotor and shaft, centrifugally actuated means for establishing a yielding driving connection between said shaft and rotor to drive the latter at an increased speed, and manual means for rendering the yielding driving connection in operable.

14. In apparatus for use in supercharging internal combustion engines, a supercharger rotor, a driving shaft, centrifugally actuated means for establishing a rigid driving connection between said rotor and shaft, and other centrifugally actuated means for establishing a yielding driving connection between said shaft and rotor to drive the latter at an increased speed, the said yielding driving connection adapted to cause the rigid driving connection to become disconnected so long as the former is in operation.

15. In combination, a driving shaft, a supercharger rotor, means for establishing a rigid driving connection between said rotor and shaft for driving the rotor at an increased speed relative to the shaft, and a friction means adapted to drivably connect said rotor and shaft at a still greater speed relative to the shaft.

16. In combination, a driving shaft, a supercharger rotor, means for establishing a rigid driving connection between said rotor and shaft for driving the rotor at an increased speed relative to the shaft, and a friction means adapted to drivably connect the said rotor and shaft and drive the rotor at a still greater speed relative to the shaft, the friction means being centrifugally operated.

17. In combination, a driving shaft, a supercharger rotor, means for establishing a rigid driving connection between said rotor and shaft for driving the rotor at an increased speed relative to the shaft, and a friction means adapted to drivably connect the said rotor and shaft and drive the rotor at a still greater speed relative to the shaft, the friction means being centrifugally operated and adapted to render the first said means inoperable so long as the last said means is operable.

18. In combination, a driving shaft, a supercharger rotor, means for establishing a rigid driving connection between said rotor and shaft for driving the rotor at an increased speed relative to the shaft, and a friction means adapted to drivably connect the said rotor and shaft and drive the rotor at a still greater speed relative to the shaft, the friction means being centrifugally operated and adapted to render the first said means inoperable so long as the last said means is operable, and manually controlled means for rendering the centrifugal means inoperable.

19. In combination, a driving shaft, a supercharger rotor, means for establishing a rigid driving connection between said rotor and shaft for driving the rotor at an increased speed relative to the shaft, and a friction means adapted to drivably connect the said rotor and shaft and drive the rotor at a still greater speed relative to the shaft, the friction means being centrifugally operated and adapted to render the first said means inoperative so long as the last said means is operable, the first said means being normally in operable engagement.

20. In combination with an internal combustion engine having a shaft and a rotary compressor having a shaft, a friction clutch mounted coaxially with both of said shafts including means for driving the compressor shaft at an increased speed relative to the engine shaft when the clutch is in its engaged position, centrifugal means carried by the clutch for increasing the frictional engagement of said clutch as the speed of the compressor shaft increases, and manually operated means for operatively controlling the centrifugal means at any speed of the compressor shaft.

21. A combination according to claim 20 in which means are provided for biasing the centrifugal means to an inoperative position.

22. A combination according to claim 20 in which means are provided for establishing a rigid connection between the engine shaft and the compressor shaft.

23. The combination according to claim 20 in which means are provided for directly connecting the engine shaft with the compressor shaft including means for rendering said first named means inoperative so long as the compressor shaft is being driven by the frictional clutch.

24. In apparatus for use in supercharging internal combustion engines, a supercharger rotor having a shaft, a driving shaft, means for establishing a rigid driving connection between said shafts, speed responsive means for disconnecting said rigid connection at a predetermined speed, and means for establishing a yielding driving connection between said shafts, the said yielding driving means adapted to drive the rotor shaft at an increased speed.

25. In apparatus for use in supercharging internal combustion engines, a supercharger rotor having a shaft, a driving shaft, means for establishing a rigid driving connection between said shafts, speed responsive means for disconnecting said rigid driving connection at a predetermined speed, and means for establishing a yielding driving connection between said shafts, the said yielding driving means adapted to drive the rotor shaft at an increased speed, both of said means being coaxially disposed with the driving shaft.

26. In apparatus for use in supercharging internal combustion engines, a supercharger rotor having a shaft, a driving shaft, means including ratchet pawls adapted to be disengaged at a predetermined speed for establishing a rigid driving connection between the said shafts, and means for establishing a yielding driving connection between said shafts, the said yielding means adapted to drive the rotor shaft at an increased speed, both of said means being coaxially disposed with the rotor shaft.

27. In apparatus for use in supercharging internal combustion engines, a supercharger rotor having a shaft, a driving shaft, means including speed responsive ratchet pawls adapted to be disengaged at a predetermined speed for establishing a rigid driving connection between the said shafts, and means for establishing a yielding driving connection between said shafts, the said yielding means adapted to drive the rotor shaft at an increased speed, both of said means being coaxially disposed with both of said shafts.

28. In apparatus for use in supercharging internal combustion engines, a supercharger rotor having a shaft, a driving shaft, means for establishing a rigid driving connection between said shafts, said means adapted to automatically disconnect said shafts at a predetermined speed, and means for establishing a yielding driving connection between said shafts, the said yielding means adapted to drive the rotor at an increased speed, whereby the supercharger rotor has a limited speed range through the rigid driving connection, but has an unlimited speed range when being driven through the yielding driving connection.

In testimony whereof I have signed my name to this specification.

CHARLES RAYMOND WASEIGE.